July 15, 1941.  N. J. PETERS  2,249,036
PASTEURIZER
Filed March 13, 1939  3 Sheets-Sheet 1

INVENTOR
Norman J. Peters
BY
Charles & French
ATTORNEYS

July 15, 1941.　　　N. J. PETERS　　　2,249,036
PASTEURIZER
Filed March 13, 1939　　　3 Sheets-Sheet 2

INVENTOR
Norman J. Peters
BY
Charles & French
ATTORNEYS

July 15, 1941.   N. J. PETERS   2,249,036
PASTEURIZER
Filed March 13, 1939   3 Sheets-Sheet 3

INVENTOR
Norman J. Peters

BY
Charles & French

ATTORNEYS

Patented July 15, 1941

2,249,036

UNITED STATES PATENT OFFICE 2,249,036

PASTEURIZER

Norman J. Peters, Fond du Lac, Wis., assignor to Damrow Brothers Company, Fond du Lac, Wis., a corporation of Wisconsin Application March 13, 1939, Serial No. 261,516

3 Claims. (Cl. 257—212)

The invention relates to pasteurizing apparatus and more particularly to a pasteurizer for milk.

The general object of a pasteurizer is to heat milk from the temperature at which it is cooled, usually about 40° Fahrenheit to about 143° Fahrenheit for pasteurizing, holding for thirty minutes and then pumping it out of the pasteurizer, cooling and bottling for distribution as market milk. Usually the heating is done in a steam or water jacketed tank, but according to the present invention the milk is brought up to a pasteurizing temperature very quickly with a low temperature heating medium so as not to affect the flavor, and the agitation is such as to pass the milk over the heating surface as quickly as possible without affecting the cream line, and without whipping the milk. According to the present invention the heated water is sprayed or distributed against the sides and bottom of the milk container to effect the heating of its contents, and since only a small volume of water is circulated through the heating system, the temperature of this water will be raised to a practical heating temperature quickly, thus heating the milk as quickly as possible. The heated water is delivered both against the sides and the bottom, and when the circulation of this water stops, the direct heating stops, so that substantially no heat is added to the milk while it is being held at a pasteurizing temperature, and hence overheating and consequent caramelization of the milk is prevented. The distributing system which is used for heating the milk can also be used for cooling with cold water or water slightly above freezing, and with a good difference in temperature the system will also act to efficiently cool the milk. While the apparatus embodying the invention has been primarily designed for milk, it may also be used for treating or making chocolate mix, buttermilk, cream, ice cream mix, and similar products. As hereinafter described, it will be noted that the apparatus is so constructed that its parts may be kept in sanitary condition.

The invention further consists in the several features hereinafter set forth and more particularly defined by claims at the conclusion hereof.

Figure 1:
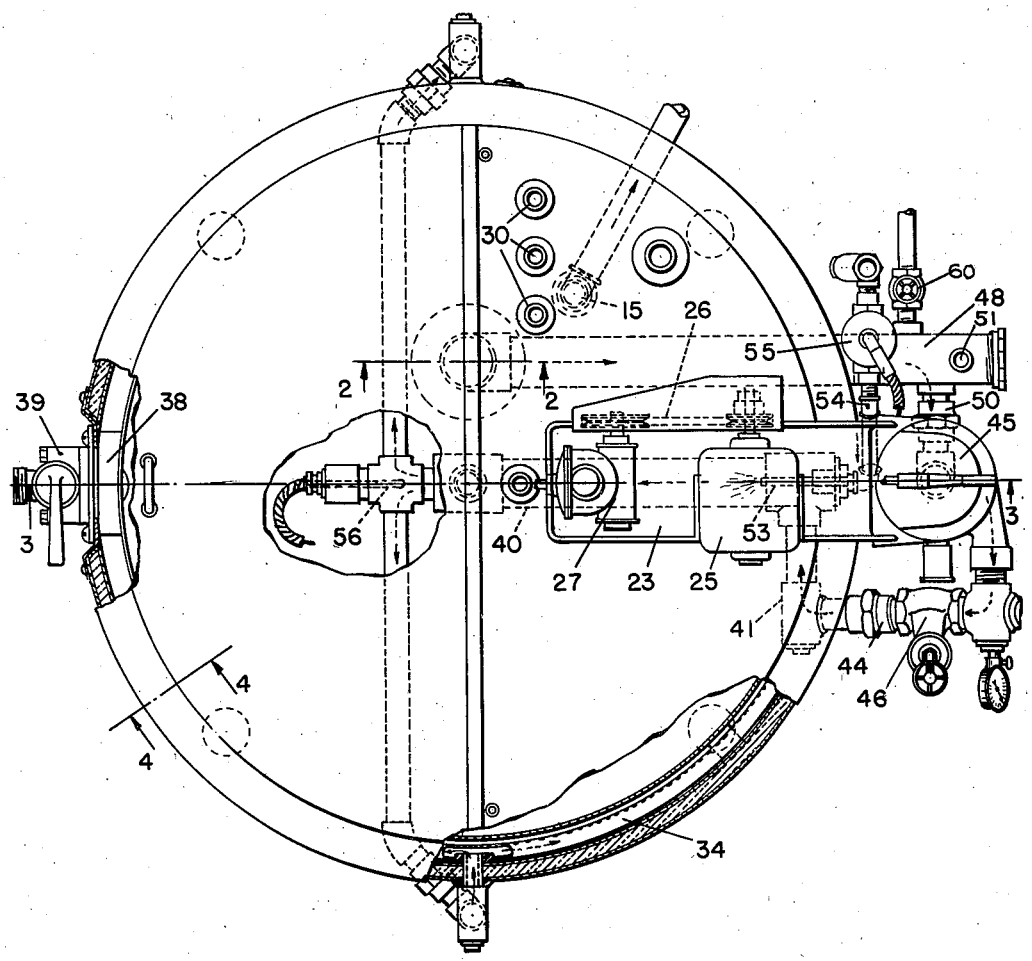
Fig. 1 is a plan view of an apparatus embodying the invention, parts being broken away and parts being shown in section.

Referring to the drawings, the apparatus comprises generally an inner container 8 for the product to be treated and an outer container 9 in which said container 8 is mounted, and means for spraying a heating or cooling fluid on the sides and bottom of the container.

The outer container 9 is a double walled cylindrical container having an outer wall 10 and an inner wall 11, the space between the walls being filled with suitable insulating material 12, said container being supported on adjustable legs 13 and having a centrally disposed water inlet opening 14 in its bottom and a drain outlet 15 extending a short distance above its bottom so that a small body of heating or cooling fluid may be maintained in the bottom portion of said container.

The inner container 8 is of cylindrical form with rounded corners 16 between the sides and bottom for ready cleaning, and said sides have an annular flange 17 secured thereto which rests on a rubber gasket 18 on the top of the outer container 9 and is detachably secured thereto by screws 19. The container 8 is provided with a cover formed of a relatively fixed semi-circular section 20 and a section 21 hingedly secured thereto along a diagonally extending hinge 22.

A shelf 23 is secured to the container 9 by screws 24 and has a motor 25 mounted thereon connected by a belt drive 26 with a reduction gear unit 27 which connects with the shaft 28 for the agitator or stirrer 29 which is offset from the center of the container 8 so as to promote the circulation of the milk up the center and down the sides of said container. The cover section 20 has a plurality of bushed openings 30 therein as shown in Fig. 1 for insertion of thermometers or other measuring instruments.

Hot water or other suitable heating or cooling fluid is delivered through a pipe 31 and outlet 31' mounted in the opening 14, against the bottom of the container 8 and is spread or filmed out by a distributor plate 32 spaced a short distance from the bottom. The bottom of the container 8 and also the plate 32 is preferably conically inclined for strength so that a relatively light gauge metal may be used though these parts may be flat if desired. Hot water is also delivered through spaced upright pipes 33 to an upper ring 34 which is provided with spray openings 35 which direct small streams of heated or cooled water against the sides of the container 8 which, after striking said sides, flow down the same and drain into the bottom of the container 9. The outer edge 36 of the plate 32 is preferably downwardly curved to facilitate the drainage of water therefrom.

The container 8 has a drainage opening 37 adjacent the bottom provided with an outlet flange 38 which detachably connects with an outlet fitting 39 detachably secured to the outer container 9.

It is to be noted that removal of the screws 19 and the fitting 39 permits the inner container 8 being lifted out of the outer container 9. The distributor plate 32 is detachably mounted on the pipe 31 and may be secured to or be separate from the bottom of the inner container 8.

The pipes 31 and 33 communicate with a pipe 40 which connects by pipes 41 and 44 with the discharge of a centrifugal pump 45, the pipe section 44 having a shutoff value 46 therein.

Figure 2:
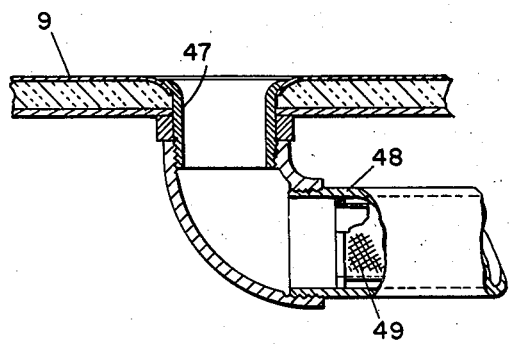
Fig. 2 is a detailed sectional view taken on the line 2—2 of Fig. 1.
Figure 3:
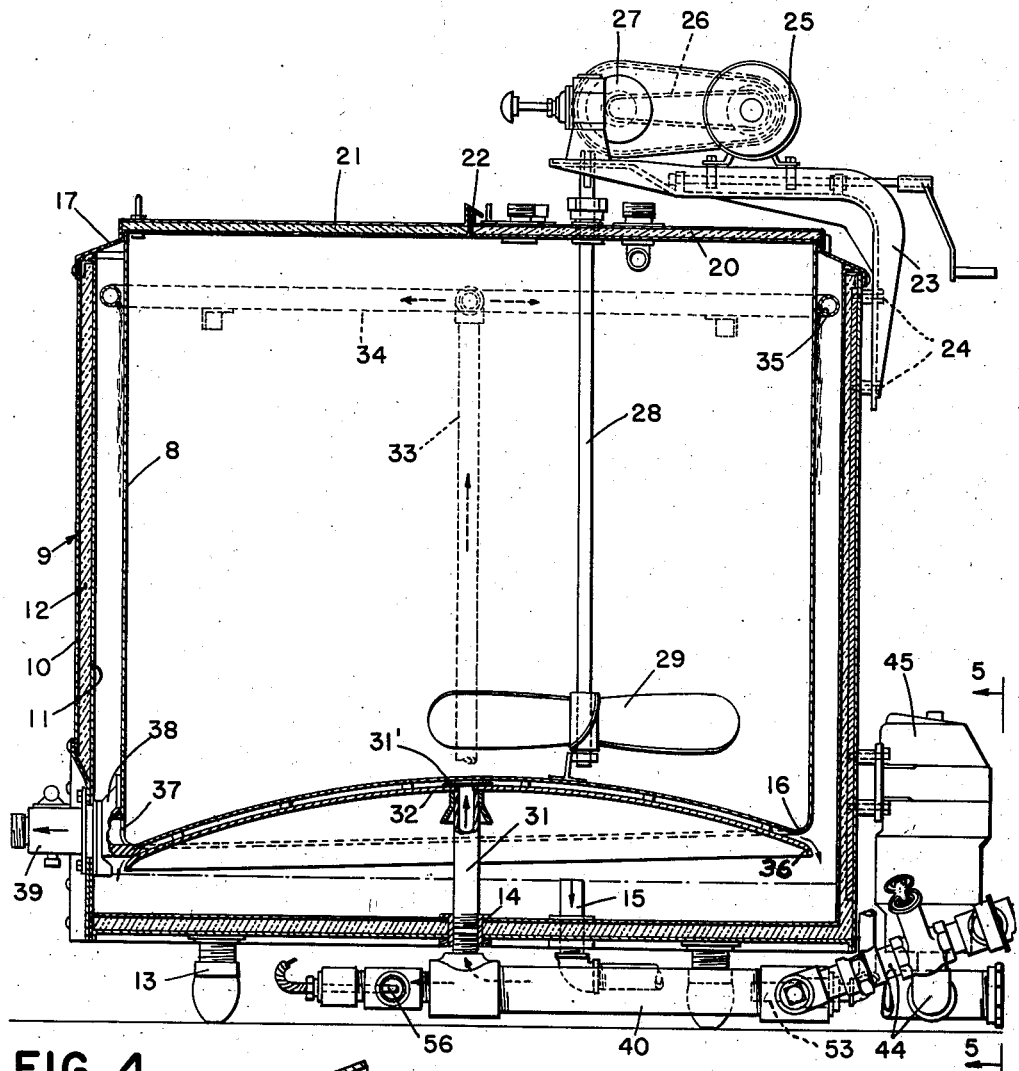
Fig. 3 is a vertical sectional view taken generally along the line 3—3 of Fig. 1.
Figure 4:
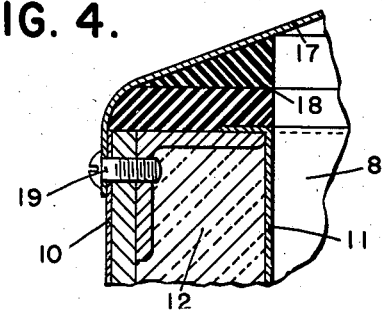
Fig. 4 is a detailed sectional view taken on the line 4—4 of Fig. 1.
Figure 5:
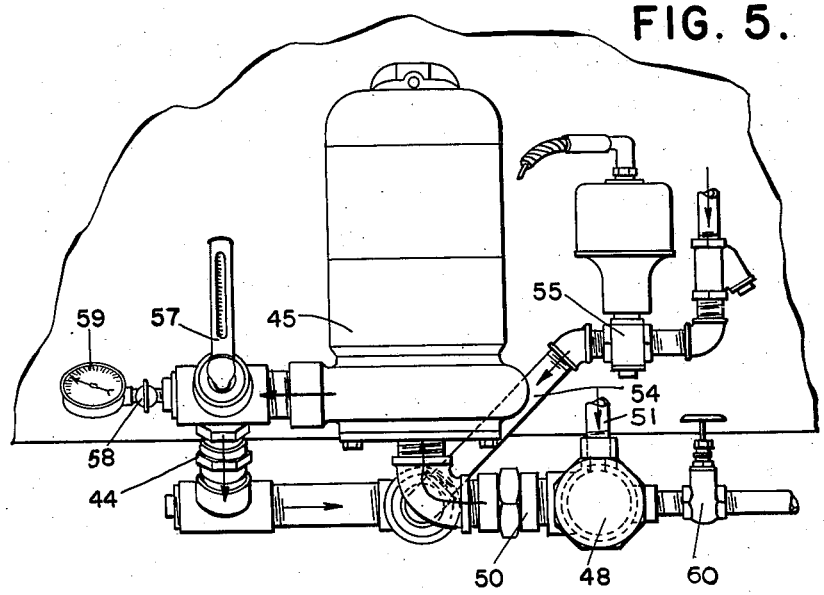
Fig. 5 is a side elevation view taken on the line 5—5 of Fig. 3.

The bottom of the tank 9 is provided with a drain opening 47 (see Figs. 1 and 2) which connects with a drain passage 48 that is provided with a strainer 49 and connects by a pipe 50 with the inlet to the pump 45. A supply of fresh water inlet 51 connects with the passage 48 and is controlled by a suitable shutoff valve.

With the above arrangement the water from the bottom of the tank 9 is circulated from the heating or cooling system by the operation of the pump 45, the water being taken in through the passage 48 and being discharged through pipes 41, 44, 40, 31, and 33 to the interior of the tank 9, the pipes 31 and 34 provided with outlets for directing water against the container 8. The pipe 15 is an overflow pipe to prevent the water rising too high above the bottom of the tank and thus acts to maintain the level of the water in the bottom of the tank at a substantially constant height.

For heating the circulating water, means are provided for introducing live steam into the discharge line comprising a steam nozzle 53 which discharges into the pipe 40 and connects with steam pipe 54 provided with a suitably controlled valve 55 that is regulated by a thermostat 56 in the pipe 40 operatively connected with said valve.

The pipe 44 has a well for a thermometer 57 and also an air outlet controlled by a valve 58, which is also associated with a pressure gauge 59.

The passage 48 has a drain outlet controlled by a shutoff valve 60.

With the above arrangement while the pump 45 and agitator 29 are running, the heating or cooling fluid is sprayed or filmed out against the sides and bottom of the inner container 8 containing the material to be treated to heat or cool the same, it being noted that in case of heating the introduction of steam into the circulating water causes the spray to expeditiously heat the substance such as milk in the container 8 to a pasteurizing temperature, as for example 143° Fahrenheit, and then by shutting off the pump or stopping the circulation the milk may be readily held at that temperature for thirty minutes, the heated water in the bottom of the tank 9 assisting in maintaining this temperature, it being noted that the agitator acts to bring different portions of milk or other material being treated in contact with the heated sides of the container 8. Thus while the contents of the container 8 may be readily brought to the desired temperature, the danger of overheating them is prevented, and thus the quality of the milk is not effected from overheating.

I desire it to be understood that this invention is not to be limited to any particular form or arrangement of parts except in so far as such limitations are included in the claims.

What I claim as my invention is:

1. In a device of the character described, the combination of an outer container, an inner container disposed within said outer container and in spaced relation thereto at the sides and bottom thereof and having siding and a bottom extending at an abrupt angle to said siding, a spreader plate adjacent the bottom of said inner container throughout substantially its entire area, means for circulating a thermal changing liquid through the outer container to change the temperature of the contents of the inner container including means for spraying streams of said liquid downwardly along the sides of said inner container and for directing a stream of said liquid between the bottom of said inner container and said plate, the bottom of said inner container being spaced from that of said outer container to provide a liquid storage space below said inner container.

2. In a device of the character described, the combination of an outer container, an inner container disposed within said outer container and in spaced relation thereto at the sides and bottom thereof and having siding and a bottom extending at an abrupt angle to said siding, a spreader plate adjacent the bottom of said inner container throughout substantially its entire area, means for circulating a thermal changing liquid through the outer container to change the temperature of the contents of the inner container including a circular pipe adjacent the upper portion of the inner chamber provided with spray openings for directing water against the sides of the inner chamber and with means for directing a thin stream of said liquid between the bottom of said inner container and said plate, the bottom of said inner container being spaced from that of said outer container to provide a liquid storage space below said inner container.

3. In a device of the character described, the combination of an outer container, an inner container extending into said outer container in spaced relation with the sides and bottom and detachably connected at its upper end with the upper portion of said outer container, a plate secured in close spaced relation to the bottom of said inner container and provided with a central opening, a pipe detachably mounted in said opening for conducting a thermal changing liquid into the space between the bottom of said inner container and said plate, a circular pipe adjacent the upper portion of the inner chamber provided with spray openings for directing water against the sides of the inner chamber, and means for circulating the thermal changing liquid through said first named pipe and said circular pipe, the bottom of said inner container being spaced from that of said outer container to provide a liquid storage space below said inner container.

NORMAN J. PETERS.